United States Patent
Nishizawa

[19]

[11] Patent Number: 5,804,003
[45] Date of Patent: Sep. 8, 1998

[54] METHOD OF MANUFACTURING AN INORGANIC BOARD

[75] Inventor: Kazuhide Nishizawa, Toyoake, Japan

[73] Assignee: Nichiha Corporation, Nagoya, Japan

[21] Appl. No.: 757,100

[22] Filed: Dec. 2, 1996

[30] Foreign Application Priority Data

Feb. 28, 1996 [JP] Japan .................................. 8-069119

[51] Int. Cl.$^6$ .............................. B32B 13/02; B32B 31/04
[52] U.S. Cl. ...................... 156/42; 106/698; 106/DIG. 2; 156/43; 156/62.8; 162/132; 162/181.1; 162/181.6; 264/333; 428/294.7; 428/312.4; 428/703
[58] Field of Search .................................. 156/39, 42, 43, 156/62.2, 62.8; 264/113, 122, 333; 106/698, 713, 731, DIG. 2; 428/703, 294.7, 312.4, 313.3, 313.7, 313.9; 162/132, 181.1, 181.6

[56] References Cited

U.S. PATENT DOCUMENTS

| | | | |
|---|---|---|---|
| 2,156,311 | 5/1939 | Schuh | 106/86 |
| 2,585,366 | 2/1952 | Bollaert et al. | 106/98 |
| 3,264,125 | 8/1966 | Bourlin | 106/89 |
| 3,565,650 | 2/1971 | Cordon | 106/97 |
| 3,951,735 | 4/1976 | Kondo et al. | 156/39 |
| 4,344,804 | 8/1982 | Bijen et al. | 156/42 |
| 4,497,662 | 2/1985 | Chisholm et al. | 264/333 |
| 5,002,696 | 3/1991 | White | 106/DIG. 2 |
| 5,114,617 | 5/1992 | Smetana et al. | 106/698 |
| 5,155,959 | 10/1992 | Richards et al. | 106/732 |
| 5,612,130 | 3/1997 | Smirnov et al. | 428/323 |

FOREIGN PATENT DOCUMENTS

| | | | |
|---|---|---|---|
| 888079 | 12/1971 | Canada | 106/DIG. 2 |
| 7609035 | 2/1977 | Netherlands | 106/698 |

*Primary Examiner*—Steven D. Maki
*Attorney, Agent, or Firm*—Donald S. Dowden; Cooper & Dunham LLP

[57] ABSTRACT

The object of the present invention is to prevent delamination of an inorganic board. To attain this object, a method of manufacturing an inorganic board comprising forming a single mat by the paper making method by using slurry of raw material mixture substantially consisting of cement material, fiber material and inorganic filler inside of which is empty wherein said empty inorganic filler is effected on an alkali treatment; laminating the plural number of said single mats to form a laminated mat; and molding, incubating and curing said laminated mat.

4 Claims, No Drawings

METHOD OF MANUFACTURING AN INORGANIC BOARD

BACKGROUND OF THE INVENTION

The present invention relates to a manufacting method of an inorganic board using a paper making method.

Traditional manufacturing method of an inorganic board using a paper making method comprises preparing a slurry by dispersing a raw material mixture including cement material and fiber in the water, paper making and dehydrating said slurry to form a single mat, laminating a plural number of said single mats by rolling on a making roll to form a base mat, and press-molding and curing said base mat. To manufacture the inorganic board having a light weight by said paper making method, an inorganic filler inside of which is empty such as silas baloon, pearlite and the like has been added in said raw material mixture.

Nevertheless, since said empty inorgfnic filler has a light weight, said empty inorganic filler is apt to rise to the surface of the slurry, said inorganic filler disperse unevenly in the resulting formed mat and especially said empty inorganic filller may be unevenly distributed on the surface of said mat.

Since said empty inorganic filler has substantially a globular form and a smooth slippery surface, when said empty inorganic filler is unevenly distributed on the surface of said mat, the surface of said mat has poor adhesiveness with the making roll and said mat mutually and it is feared that said mat is difficult to be rolled on the making roll and the laminated mat or the inorganic board which is obtained by curing said laminated mat has poor interlaminate strength to result in delamination in said laminated mat or said inorganic board.

SUMMARY OF THE INVENTION

Accordingly, the object of the present invention is to prevent an inorganic filler inside of which is empty from floating up in a slurry of the raw materials of an inorganic board.

Further object of the present invention is to manufacture an inorganic board in which said empty inorganic filler is uniformly distributed.

Still further object of the present invention is to manufacture an inorganic board having a light weight and high interlaminate strength.

Briefly said objects of the present invention can be attained by a method of manufacturing an inorganic board comprising forming a single mat by the paper making method by using slurry of raw material mixture substantially consisting of cement material, fiber material and inorganic filler inside of which is empty wherein said empty inorganic filler is effected on an alkali treatment; laminating the plural number of said single mats to form a laminated mat; and molding, incubating and curing said laminated mat.

DETAILED DESCRIPTION OF THE INVENTION

Raw material mixture of the inorganic board

A raw matereial mixture used in the present invention may substantially consist of cement material and fiber material. Said cement material may be one or the mixture of more than two kinds of Portland cement, jet cement, blast furnace cement, fly ash cement, alumina cement and the like. Said fiber material may be one or the mixture of more than two kinds of organic fiber such as pulp fiber, opened scrap fiber, polyester fiber, polyamide fiber, acrylic fiber, acetate fiber, polyethylene fiber, polypropylene fiber and the like, and inorganic fiber such as glass fiber, carbon fiber, ceramic fiber, rockwool and the like. Said fiber materials are mixed in an amount between 1~20% by weight.

Inorganic filler inside of which is empty

An inorganic filler inside of which is empty is further added to said raw material mixture. Said empty inorganic filler inside of which is empty may be such as silas balloon, pearlite, fly ash, glass balloon, alumina bubble and the like and the mixture of two or more kinds of said inorganic filler may also be used in the present invention. Said empty inorganic filler is effected on alkali treatment in the present invention. Said alkali treatment is carried out by immersing said inorganic filler in an alkaline aqueous solution such as caustic soda aqueous solution, caustic potash aqueous solution, calcium hydroxide aqueous solution and pH of said alkaline solution is desirably adjusted higher than 9 and immersing time is desirably more than 10 minutes and said alkali solution is desirably stirred during immersion. The drainage discharged from the paper making process includes alkaline material originated from cement material in the slurry so that said drainage can be used as an alkaline aqueous solution to treat said empty inorganic filler.

By said alkali treatment, the surface of the shell of said empty inorganic filler is dissolved into the alkali aqueous solution to increase hydrophilic property of said surface of the shell, and further the shell of said inorganic filler is partially collapsed to form holes and the globular form of said empty inorganic filler is deformed. Accordingly, the resulting empty inorganic filler treated with alkali aqueous solution has an increased apparent specific gravity by getting the water into the empty inside of said inorganic filler and said inorganic filler may be difficult to rise to the surface of the slurry and disperse uniformly in the slurry.

Accordingly, said empty inorganic filler is uniformly dispersed in the resulting mat paper-made by using said slurry in which said inorganic filler is evenly dispersed and the deviation of said empty inorganic filler on the surface of said mat is certainly prevented. Further as above described since said empty inorganic filler is deformed by the alkali treatment, the surface of the resulting empty inorganic filler has no smoothness so that the adhesiveness of the resulting mat with the making roll and said mat mutually greatly increases and thus said mat may be certainly rolled on the making roll and the interlaminate strength of said mat and the resulting empty inorganic board also increase to prevent delamination.

Said empty inorganic filler may be added to said raw materials mixturte of the inorganic board in an amount between 1 to 20% by weight and further when a solid inorganic powder such as calcium hydroxide, calcium carbonate, slag, silica fume, talc, rockwool and the like is added during the alkali treatment of said empty inorganic filler, the hydrophilic property of said solid inorganic powder increases to absorb said empty inorganic powder and said empty inorganic filler is precipitated together with said inorganic powder and as a result, the floating up of said empty inorganic filler is more certainly prevented.

Preparation of the slurry

Said raw material mixture is dispersed in the water to prepare a slurry and the solid content of said slurry is commonly adjusted between 5 to 20% by weight. Further, if desired, a curing promoter such as calcium chloride, magnesium chloride, sodium carbonate, sodium aluminate, water glass and the like; a water-proofing agent such as wax, paraffin, silicon and the like may be added to said slurry.

Forming of mat

A single mat is formed by the common paper making method such as the flow on method, Hachek method, the long net method, the casting method and the like; and the resulting single mat is rolled on the making roll to laminate the plural number of said single mat. Commonly the thickness of the resulting laminated mat is adjusted between 6 to 20 mm.

Press molding

The resulting laminated mat is molded by the press. Commonly, the mold unit the surface of which has an embossing design is used in said press molding and said mold unit may be the panel type mold unit, the roll press type mold unit and the like, and when the roll press type mold unit is used, the continuous press molding process can be carried out.

Said empty inorganic filler treated by alkali aqueous solution is uniformly dispersed in each layer of said laminated mat so that said laminated mat has an improved high interlaminate strength and therefore press mold ability of said laminated mat is much improved.

Incubation and curing

The resulting laminated mat which is press-molded is then incubated and cured to obtain an inorganic board of the present invention. The incubation with heating is commonly applied and said incubation is commonly carried out at a temperature between 50° to 80° C., in a relative humidity between 90 to 100% RH and for 7 to 24 hours.

EXAMPLE

A raw material mixture having the following formulation was prepared.

| Portland cement | 40% by weight |
| Slag | 40% by weight |
| Pulp | 10% by weight |
| Pearlite with alkali treatment* | 10% by weight |

*Pearlite as an empty inorganic filler and slag as an inorganic powder are immersed in a caustic soda aqueous solution (pH 10.5) for 30 min with stirring.

Said raw material mixture was dispersed in the water to prepare a slurry the solid content of which is 10% by weight and a single mat was formed by the paper making method using the long net and a laminated mat having a thickness of 12 mm was formed by rolling said single mat on the making roll to laminate the plural number of said single mats.

Said resulting laminated mat was cut at a predetermined length and then removed from said making roll followed by press molding using a panel type mold unit. The resulting laminated mat which is press-molded was then incubated and cured at 70° C. and in 95 RH for 10 hours and after then said laminated press molded and incubated mat was dried to adjust water content to be about 10% by weight to manufacture inorganic board samples.

No delamination was recognized during said press molding and the interlaminate stregth (vertical peeling strength) was determined for each sample and the results are shown in Table 1.

Referring to Table 1, it is recognized that each sample of the present invention using pearlite with alkali treatment as an empty inorganic filler (EXAMPLE 1 to 4) has much higher interlaminate strength (vertical peeling strength) and much higher productivity than samples using pearlite without alkali treatment as an empty inorganic filler (COMPARISONS 1 and 2).

TABLE 1

| Test item | Example 1 | Example 2 | Example 3 | Example 4 | Comparison 1 | Comparison 2 |
| --- | --- | --- | --- | --- | --- | --- |
| PH of alkali aqueous solution for treatment of pearlite | 11 | 10 | 9 | 8 | 7 | without treatment |
| Specific gravity (g/cm$^3$) | 0.94 | 0.94 | 0.93 | 0.91 | 0.90 | 0.88 |
| Bending strength (kgf/cm$^2$) | 131 | 132 | 127 | 115 | 98 | 95 |
| Vertical peeling strength (kgf/cm$^2$) | 12.0 | 11.5 | 10.1 | 6.5 | 4.2 | 3.1 |
| Delamination at freezing and thawing | — | — | ± | + | ++ | ++ |
| Freezing and thawing swelling ratio (%) | 2.7 | 3.1 | 5.5 | 13.6 | 15.8 | 26.8 |
| Delamination when the mat is rolled on the making roll | — | — | ± | + | + | ++ |

−: no delamination
±: almost no delamination
+: slight delamination
++: delamination

We claim:

1. A method of manufacturing an inorganic board comprising forming a plurality of single mats wherein each single mat is formed from a slurry of a raw material mixture substantially consisting of cement material, fiber material and inorganic filler which has a shell inside of which is empty wherein the slurry is prepared by mixing water, the empty inorganic filler, the cement material and the fiber material; treating the inorganic filler with an alkali treatment to dissolve the surface of the shell of the empty inorganic filler to increase the hydrophilic property of the surface of the shell before mixing the water, the empty inorganic filler, the cement material and the fiber material; laminating a plural number of said single mats to form a laminated mat; and molding, incubating and curing said laminated mat.

2. A method of manufacturing an inorganic board in accordance with claim 1, wherein said alkali treatment comprises immersing said empty inorganic filler in alkali aqueous solution at more than pH 9 with agitation for longer than 10 min.

3. A method of manufacturing an inorganic board in accordance with claim 2, wherein said cement material is further added to said alkali aqueous solution.

4. A method of manufacturing an inorganic board in accordance with claim 1, 2 or 3, wherein said inorganic filler is selected from the croup consisting of silas baloon, pearlite, fly ash baloon, glass baloon and alumina bubble and mixtures thereof.

* * * * *